Sept. 10, 1946.    A. F. HOESEL    2,407,552
PIPE THREAD GASKET
Filed July 1, 1944

INVENTOR
Anthony F. Hoesel

Patented Sept. 10, 1946

2,407,552

UNITED STATES PATENT OFFICE 2,407,552

PIPE THREAD GASKET

Anthony F. Hoesel, Chicago, Ill.

Application July 1, 1944, Serial No. 543,085

2 Claims. (Cl. 288—20)

The present invention relates to pipe thread joints and specifically relates to a gasket interposed between the male and female threads, of such joints, whereby the tightening, of the taper male thread into the taper female thread, compresses the material, of the gasket, therebetween and fills out the inequalities, between the mating threads, thereby preventing leakage through the threads.

The present invention relates, in part, to my present pending applications Serial No. 563,481 filed November 15, 1944, Serial No. 566,451 filed December 4, 1944, Serial No. 570,628 filed December 30, 1944, Serial No. 578,088 filed February 15, 1945, Serial No. 579,859 filed February 26, 1945 and Serial No. 594,771 filed May 19, 1945.

Presently, it is a universal practice to use some paint-like or putty-like material such as white lead or red lead, in the former instance, and litharge, etc., in the latter instance, for the purpose of filling out the thread inequalities of all such joints and also to provide the necessary lubrication for pulling up the threads without galling the same.

The use of such materials is generally a messy job and thread inequalities must be of a low magnitude in order for them to prove effective even with a heavy pull up.

Inasmuch as all flat surface joints, subject to pressure, are gasketed to take up surface irregularities, we can consider taper mating threads as a plurality of flat surfaces and the desirability of gasketing the same is readily apparent.

An object, of the present invention, is to provide a gasket, for pipe thread joints, to prevent leakage therethrough while under pressure.

A further object, of the present invention, is to provide a metallic gasket, for pipe thread joints, which does not readily seize with the mating thread materials.

Another object, of the present invention, is to provide a gasket, for pipe thread joints, which is pre-lubricated to facilitate installation.

Figure 1:
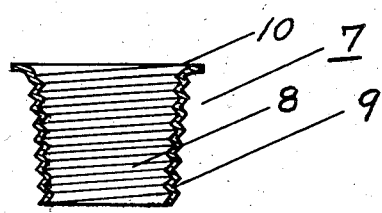
Fig. 1 is a sectional view of a thread gasket embodying the invention.

Referring to the drawing:

In Fig. 1 the thread gasket 7 comprises a tubular structure having internal threads 8 and external threads 9 in relative position with each other. These threads are shown tapering to somewhat correspond with the taper of the joint threads although they need not be if the material, comprising the thread gasket, is sufficiently ductile. The flange 10 provides a stop means for use with the tools shown in Figs. 2 and 3, and also provides another means hereinafter explained.

The thread gasket 7 may be made of various materials, both metallic and non-metallic, although, for common steel pipe work, I prefer copper and copper alloys.

Figure 2:
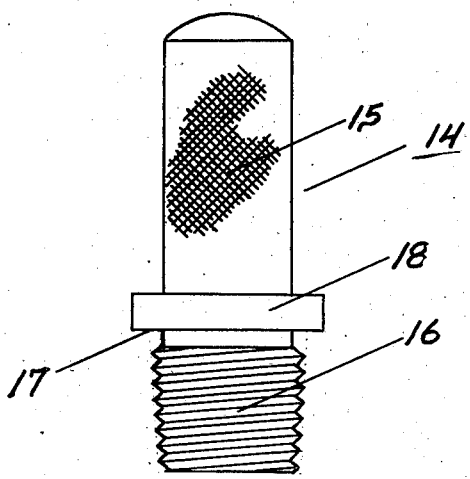
Fig. 2 is a view of a tool for readily inserting the gasket within a female thread.

In Fig. 2, the thread gasket tool 14 has a knurled handle 15, a threaded portion 16 for loosely engaging the internal threads 8 of the thread gasket 7. The face 17, of the flange 18, is for the purpose of engaging the flange 10 of the thread gasket 7 for the purpose of screwing the gasket into a female pipe thread.

Figure 3:
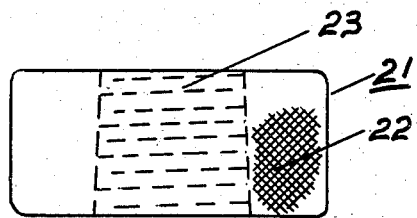
Fig. 3 is a view of a tool for readily applying the gasket to a male thread.

In Fig. 3, the thread gasket tool 21 is of disclike form and knurled, as indicated by 22. A taper threaded bore 23 loosely engages the external threads 9, of the thread gasket 7, while the face 24 engages the flange 10, of the same, when applying the gasket to a male pipe thread.

Figure 4:
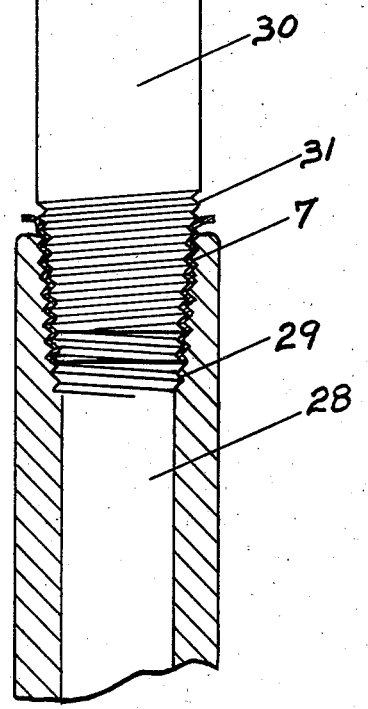
Fig. 4 is a cross-sectional view of a pipe thread joint with a thread gasket.

In Fig. 4 a pipe fitting 28 has a female pipe thread 29, and a pipe 30 has a male pipe thread 31. The thread gasket 7, threaded upon the male thread or threaded into the female thread prior to screwing the pipe into the fitting, is now completely compressed between the threads and, due to ductility, the thread inequalities are taken up thereby preventing leakage through the threads.

Figure 5:
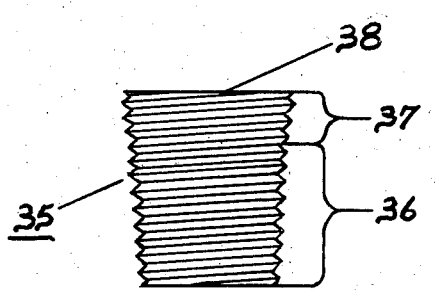
Fig. 5 is a cross-sectional view of a modification, of a thread gasket, embodying the invention.

In Fig. 5, the thread gasket 35 has a threaded portion 36 similar to thread gasket 7; however, the flange 10, of Fig. 1, has been replaced by a threaded portion 37 which has a much greater taper than threaded portion 36. The face 38 engages the faces 17 and 24 of the tools 14 and 21 respectively.

Inasmuch as the thread gaskets are made of very thin material and since it is desirable to have them coextensive with the joint thread length we find that the male thread, when being pulled up, sometimes tends to screw the gasket further into the female thread; therefore, the flange 10, of Fig. 1, and the threaded portion 37, of Fig. 5, serve to provide the extra material for such conditions.

To facilitate the turning of the threads, when making up the joint, I propose to pre-lubricate these thread gaskets by means of dipping them in some heated wax-like lubricant which will leave a very thin surface film.

While the drawing shows and the specification explains two embodiments of the invention, it is understood that various modifications may be employed without departing from the spirit and scope of the invention which is to be limited only by the following claims.

I claim:

1. A thread gasket, for pipe threaded joints, comprising a tubular structure having internal and external taper threads and an integral outwardly flaring flange adjacent the large diameter of the tapered threads.

2. A thread gasket, for pipe threaded joints, comprising a tubular structure having internal and external taper threads, the taper, adjacent the small end, being of a given degree, and the taper, adjacent the large end, being of a greater degree.

ANTHONY F. HOESEL.